(12) United States Patent
Singh et al.

(10) Patent No.: US 8,201,749 B2
(45) Date of Patent: *Jun. 19, 2012

(54) SMART CARD SESSION OPTIMIZATION

(75) Inventors: Ravi Singh, Mississauga (CA); Dinah Lea Marie Davis, Waterloo (CA); Neil Patrick Adams, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 101 days.

This patent is subject to a terminal disclaimer.

(21) Appl. No.: 12/790,940

(22) Filed: May 31, 2010

(65) Prior Publication Data

US 2010/0230492 A1 Sep. 16, 2010

Related U.S. Application Data

(63) Continuation of application No. 11/688,935, filed on Mar. 21, 2007, now Pat. No. 7,726,568.

(51) Int. Cl.
G06K 19/06 (2006.01)

(52) U.S. Cl. ..... 235/492; 235/487; 340/10.1; 340/572.1

(58) Field of Classification Search .................. 235/487, 235/492; 340/10, 572
See application file for complete search history.

(56) References Cited

U.S. PATENT DOCUMENTS

| | | | |
|---|---|---|---|
| 6,330,653 B1 | 12/2001 | Murray et al. | |
| 6,439,464 B1 | 8/2002 | Fruhauf et al. | |
| 7,011,247 B2 | 3/2006 | Drabczuk et al. | |
| 7,726,568 B2 * | 6/2010 | Singh et al. | 235/451 |
| 2003/0065698 A1 | 4/2003 | Ford | |
| 2003/0212635 A1 | 11/2003 | Kisliakov | |
| 2004/0039742 A1 | 2/2004 | Barsness et al. | |
| 2004/0177215 A1 | 9/2004 | Nagamasa et al. | |
| 2005/0053095 A1 * | 3/2005 | Kato et al. | 370/474 |
| 2006/0041746 A1 | 2/2006 | Kirkup et al. | |
| 2006/0049243 A1 * | 3/2006 | Sakamura et al. | 235/380 |
| 2006/0289659 A1 * | 12/2006 | Mizushima | 235/492 |

OTHER PUBLICATIONS

Extended European Search Report issued in respect of EP Patent Application No. 07104614.8.
Jevtic, Nenad, Second Office Action for CA 2,625,784, Mar. 6, 2012.

* cited by examiner

*Primary Examiner* — Michael G Lee
*Assistant Examiner* — Matthew Mikels
(74) *Attorney, Agent, or Firm* — Integral Intellectual Property Inc.; Miriam Paton (57) ABSTRACT

A method is provided for facilitating communications between a computer device and a smart card reader having an associated smart card. The computer device includes a smart card resource manager and a smart card reader service, the smart card reader service acting as a relay for commands between the smart card resource manager and the smart card reader. The method comprising the smart card reader service: (a) receiving from the smart card resource manager a first command for placing the smart card in a first state and relaying the first command to the smart card reader; (b) receiving a second command from the smart card resource manager for placing the smart card into a second state and a third command from the smart card resource manager for placing the smart card into the first state; and (c) determining if the smart card was in the first state prior to receiving the second command, and (i) if the smart card is determined to have been in the first state then forgoing relaying the second command and the third command to the smart card reader, and (ii) if the smart card is not determined to have been in the first state, then relaying the second command and the third command to the smart card reader.

20 Claims, 10 Drawing Sheets

SMART CARD SESSION OPTIMIZATION

CROSS-REFERENCE TO RELATED APPLICATIONS

The present application is a continuation of U.S. patent application Ser. No. 11/688,935, filed Mar. 21, 2007, soon to be issued as U.S. Pat. No. 7,726,568, the contents of which are hereby incorporated herein by reference.

FIELD

The present application relates generally to smart card readers and, in particular, to communications between a smart card reader and a computer system.

BACKGROUND

Smart card readers are used in a variety of applications, for example in combination with handheld devices and personal computers for security related purposes.

Some operating systems (such as Microsoft Windows) installed in personal computers include a generic or multipurpose smart card resource manager. Third party vendors may also provide their own smart card readers, which may thus require their own smart card reader drivers to be installed for use with the operating system. In such instances, the smart card resource manager may communicate with the vendor specific smart card reader driver first in order to access or communicate with the smart card reader.

Improved efficiencies in communications between smart card resource managers, smart card reader drivers and smart card readers is desirable.

BRIEF DESCRIPTION OF THE DRAWINGS

Reference will now be made to the drawings, which show by way of example, embodiments of the invention, and in which.

DETAILED DESCRIPTION

According to one aspect described herein, there is provided a method of facilitating communications between a computer device and a smart card reader having an associated smart card, the computer device including a smart card resource manager and a smart card reader service, the smart card reader service acting as a relay for commands between the smart card resource manager and the smart card reader. The method comprising the smart card reader service: (a) receiving from the smart card resource manager a first command for placing the smart card in a first state and relaying the first command to the smart card reader; (b) receiving a second command from the smart card resource manager for placing the smart card into a second state and a third command from the smart card resource manager for placing the smart card into the first state; and (c) determining if the smart card was in the first state prior to receiving the second command, and (i) if the smart card is determined to have been in the first state then forgoing relaying the second command and the third command to the smart card reader, and (ii) if the smart card is not determined to have been in the first state, then relaying the second command and the third command to the smart card reader.

According to another aspect there is provided a computer device for communicating over a wireless communications link with a smart card reader, the computer device comprising: a smart card resource manager for providing commands for the smart card reader; and a smart card reader service for selectively relaying and filtering commands received from the smartcard resource manager for the smart card reader, the smart card reader service being configured for: (a) receiving from the smart card resource manager a first command for placing the smart card in a first state and relaying the first command to the smart card reader; (b) receiving a second command from the smart card resource manager for placing the smart card into a second state and a third command from the smart card resource manager for placing the smart card into the first state; and (c) determining if the smart card was in the first state prior to receiving the second command, and (i) if the smart card is determined to have been in the first state then forgoing relaying the second command and the third command to the smart card reader, and (ii) if the smart card is not determined to have been in the first state, then relaying the second command and the third command to the smart card reader.

As suggested above, some operating systems (such as Microsoft Windows) installed in personal computers include a generic or multipurpose smart card resource manager. Third party vendors may also provide their own smart card readers, which may thus require their own smart card reader drivers to be installed for use with the operating system. In such instances, the smart card resource manager may communicate with the vendor specific smart card reader driver first in order to access or communicate with the smart card reader. In other words, the vendor supplied smart card reader driver would merely act as a flow-through or relay of any instructions from the smart card resource manager to the smart card reader. A difficulty with such systems is that many commands from the smart card resource manager may be redundant or unnecessary, and relaying such commands to the smart card reader may be an inefficient use of time and computational resources. Thus, more efficient management of communications between a generic smart card resource manager and a smart card reader is desired.

Figure 1:
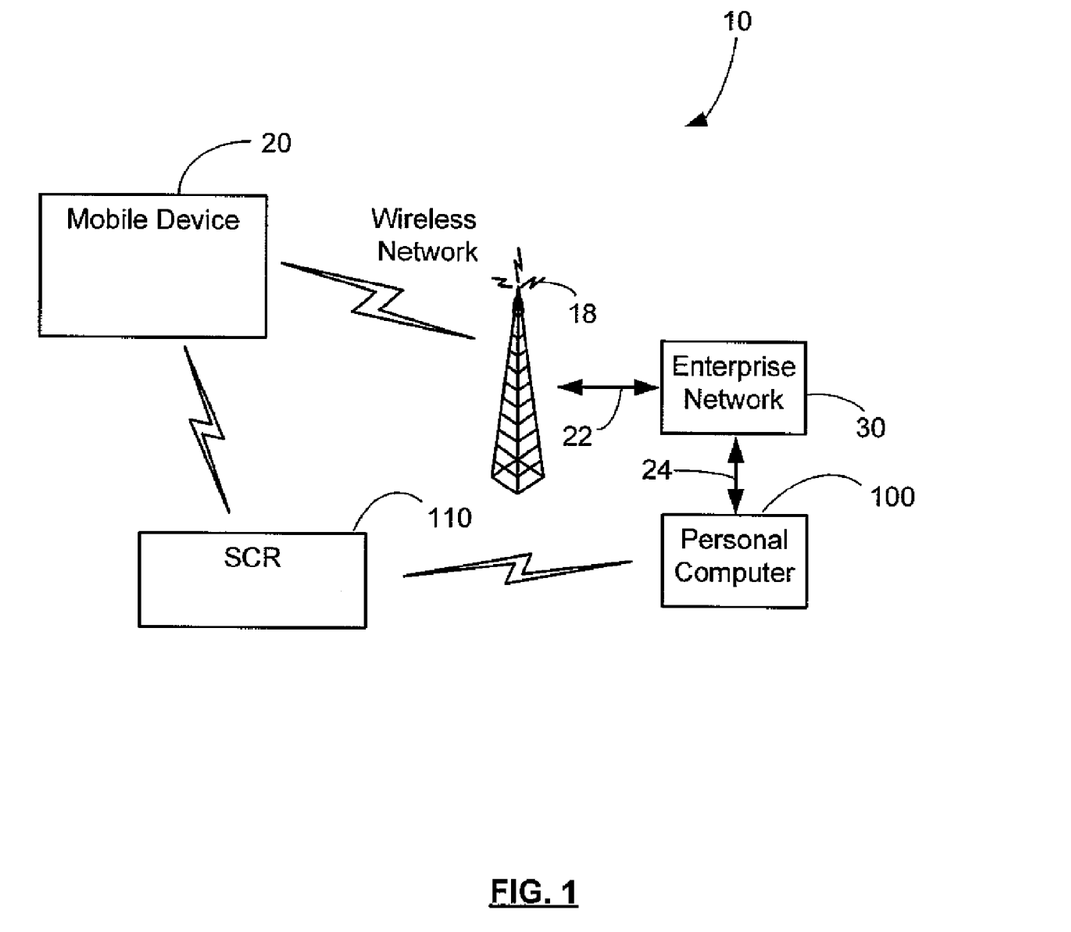
FIG. 1 shows in block diagram form a communication system suitable for a smart card reader and personal computer in accordance with one embodiment.

Reference is first made to FIG. 1, which shows an illustrative communication system 10 to which embodiments described herein can be applied. The system 10 includes one or more mobile devices 20 (only one of which is shown in FIG. 1) that are enabled to communicate with one or more wireless networks 18. The wireless network 18 may be implemented as a packet-based cellular wide area wireless network that includes a number of base stations each providing wireless Radio Frequency (RF) coverage to a corresponding area or cell. In some embodiments, instead of or in addition to a wide area wireless network, network 18 may include a local wireless area network, such as for example a wireless local area network that conforms to IEEE 802.11 standards such as 802.11b and/or 802.11g. In at least some example embodiments, the wireless network 18 is connected through intermediate communications links 22, including for example the Internet, to one or more enterprise networks 30 each associated with respective mobile devices 20, such that the mobile devices 20 are each enabled to exchange electronic messages and other information with the enterprise networks that they are associated with. At least some of the mobile devices 20 have a further associated secondary mobile device in the form of a smart card reader 110. Additionally, a user of the mobile device 20 and the smart card reader 110 will have access to a personal computer 100 that is connected to the enterprise network 30 over a communications link 24. In one embodiment, the communications link 24 is a local area network or wide area network providing organizational connectivity with the enterprise network 30. The smart card reader 110 may also be used with the personal computer 100, through either a wired or wireless connection.

Figure 2:
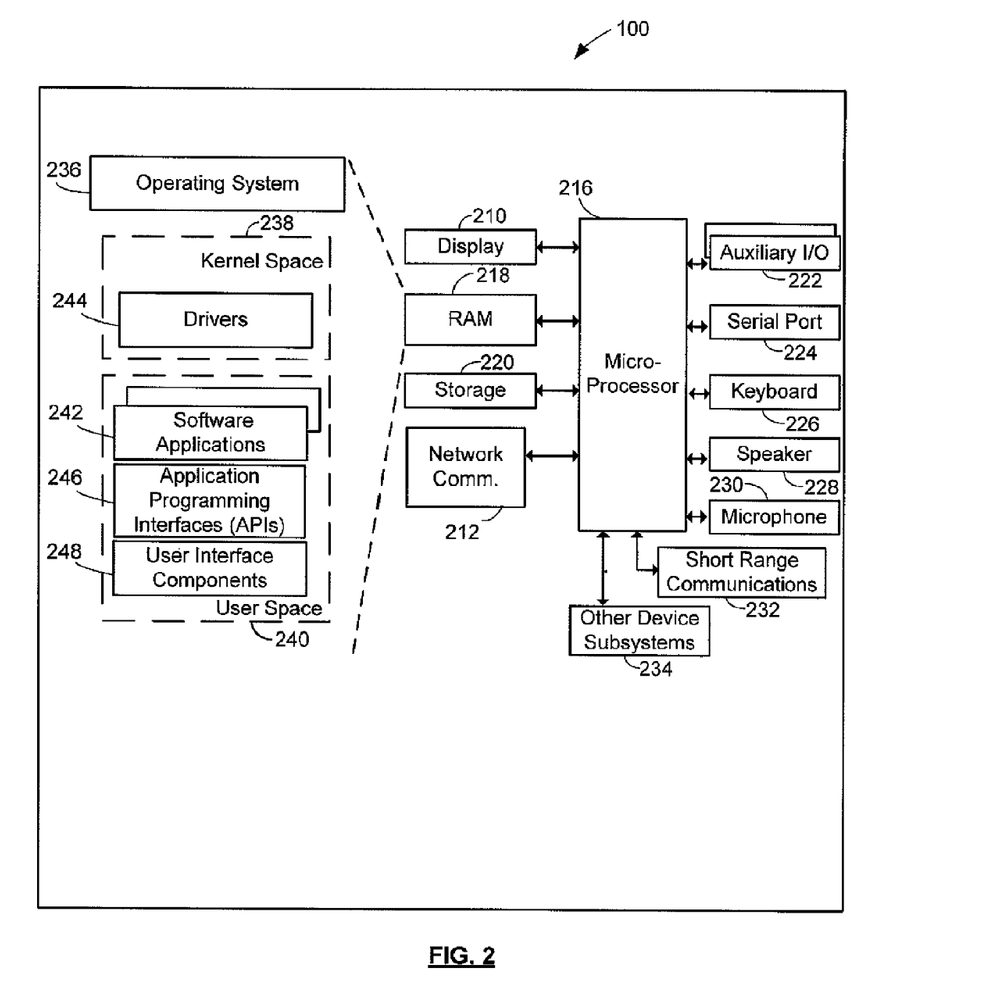
FIG. 2 shows an operational block representation of a personal computing device according to one embodiment.

Reference is next made to FIG. 2, which shows in greater detail an embodiment of the personal computer 100. The personal computer 100 includes a display sub-system 210 and a network communication subsystem 212 for two-way communications with the enterprise network 30 (FIG. 1). According to one embodiment, the communications subsystem 212 may include a wireless communications subsystem including antennas (not shown), RF transceivers (not shown), and some signal processing capabilities, implemented, for example, by a digital signal processor (not shown). According to another embodiment, the communications subsystem 212 may include a wired communications subsystem conforming to the well known Ethernet standard, including a 10 Mbps, 100 Mbps, or 1 Gbps Ethernet connection. The personal computer 100 also includes a controller in the form of at least one microprocessor 216 which is suitably programmed to control the overall operation and functions of the personal computer 100, which are described in more detail below. The personal computer 100 includes peripheral devices or subsystems such as a random access memory 218, a storage device 220 such as a hard disk drive, an auxiliary input/output (I/O) subsystem 222 (e.g., a mouse), a serial port 224 (e.g., a USB port), an input device 226 (e.g., a keyboard), a speaker 228, a microphone 230, a short-range communications subsystem 232 (e.g., an infrared transceiver, wireless bus protocol such as a Bluetooth™ system, or any other means of local wireless communications), and any other device subsystems generally designated by reference 234.

The microprocessor 216 operates under stored program control with code being stored in the storage device 220. As depicted in FIG. 2, while operational, the RAM 218 includes programs including an operating system program or code module 236, such as the Microsoft Windows™ operating system. Operating systems such as Windows typically divide the RAM space 218 into two portions, namely a restricted access space such as a kernel space 238 and a user space 240, or functional equivalents thereof. The RAM 218 further includes software applications indicated generally by reference 242, which typically reside in the user space 240, and drivers 244, which typically reside in the kernel space 238. The user space further includes various application programming interfaces (APIs) 246 and various user interface (UI) components 248. The UI components 248 are the existing functions or routines provided by the operating system 236 that may be called by programs such as the software applications 242 in order to display elements of the graphical user interface to the user of the personal computer 100.

The operating system code 236, code for specific software applications 242, code for the drivers 244, code for the various application programming interfaces (APIs) 246, or code for the various user interface (UI) components 248 is permanently or semi-permanently stored on the storage device 220 and may be temporarily loaded into a volatile storage medium such as the RAM 218 during operation of the personal computer 100. Received communication signals and other data with information may also be stored in the RAM 218. Code for the specific device applications 242 or other elements of the user space 240 may be swapped back out to the storage device 220 as needed during operation of the personal computer 100, while code related to the kernel space 238 such as many aspects of the operating system code 236 and/or the drivers 244 is typically loaded into the RAM 218 upon boot-up of the personal computer 100 and is retained in the RAM 218 as long as the personal computer 100 remains powered up.

The stored program control (e.g. operating system 236, software applications 242) for the microprocessor 216 also includes a predetermined set of applications or code components or software modules that control basic device operations, for example, data and text communication applications which are normally installed on the personal computer 100 as the software applications 242 when the personal computer 100 is first configured. Further applications may also be loaded (i.e., downloaded) onto the personal computer 100 through the operation of networks described above for FIG. 1, the auxiliary I/O subsystem 222, the serial port 224, or the short-range communications subsystem 232. The downloaded code module or components are then installed by the user (or automatically) in the RAM 218 or the storage device 220.

The serial port 224 comprises a USB type interface port for interfacing or synchronizing with another device, such as the mobile device 20 or the smart card reader 110. In one embodiment, the serial port 224 may be used to communicate with the smart card reader 110. The short-range communications subsystem 232 provides an interface for communication between the personal computer 100 and other devices, including the smart card reader 110, to be described in greater detail in connection with FIG. 3, below. For example, the subsystem 232 may comprise an infrared communication link or channel, a wireless bus protocol such as a Bluetooth™ communications subsystem, or any other localized wireless means of communication.

Figure 3:
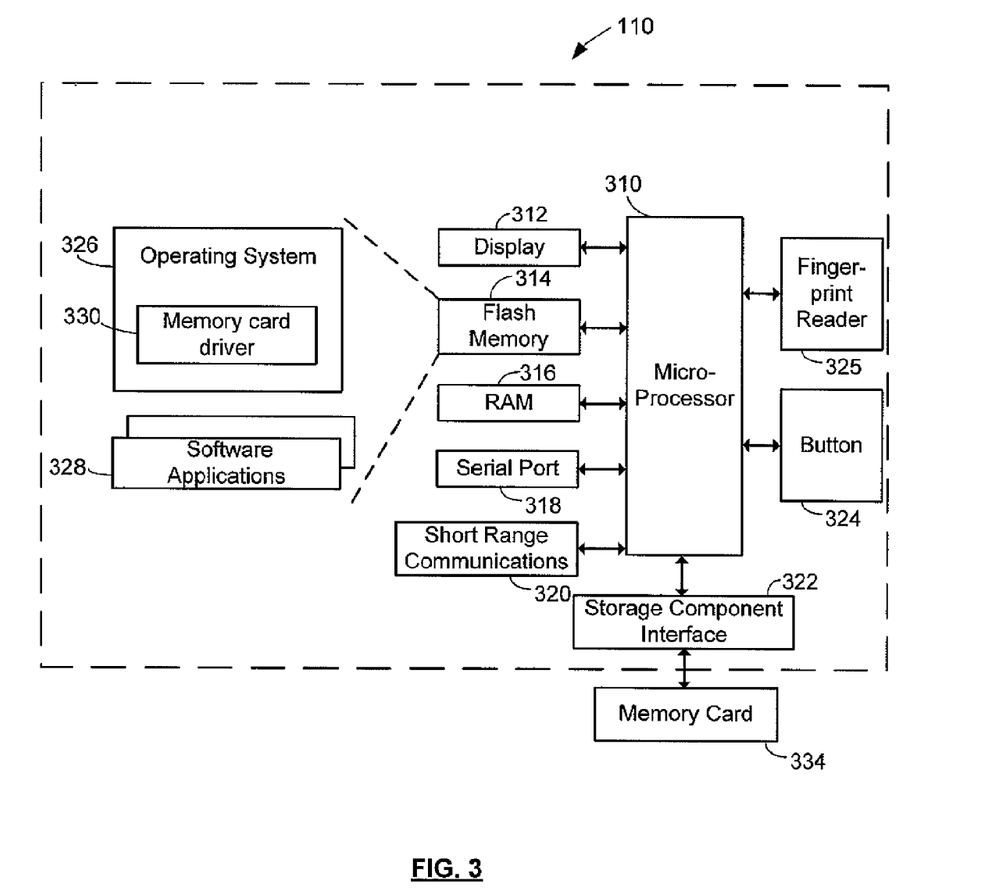
FIG. 3 shows an operational block representation of an embodiment of a smart card reader for use with the personal computing device shown in FIG. 2.

Reference is next made to FIG. 3, which shows in greater detail an example embodiment of a secondary mobile device, namely the smart card reader 110. The smart card reader 110 includes a controller including at least one microprocessor 310, which is suitably programmed to control the overall operation and functions of the smart card reader 110, and an output device (e.g., a display module 312). The smart card reader 110 further includes peripheral devices or subsystems such as a flash memory 314, a random access memory (RAM) 316, a serial port 318 (e.g., a USB port), a short-range communications subsystem 320 (e.g., an infrared transceiver, wireless bus protocol such as a Bluetooth system, or any other means of local communications), a storage component interface 322 (e.g., for a memory card or any other data storage device), a user input device 324 (e.g., a push button), and a biometric input device 325 (e.g., a fingerprint reader).

The microprocessor 310 operates under stored program control with code or firmware being stored in the flash memory 314 (or other type of non-volatile memory device or devices). As depicted in FIG. 3, the stored programs include an operating system program or code module 326 and other programs or software applications indicated generally by reference 328. The operating system 326 of the smart card reader 110 further includes a memory card driver component 330. The memory card driver 330 is responsible for coordinating communications between the smart card reader 110 and a memory card 334 and/or between the smart card reader 110 and related drivers of a device to be used in conjunction with the smart card reader 110, such as the drivers 244 of the personal computer 100. The operating system code 326, code for specific software applications 328, code for the memory card driver 330, or code components thereof, may be temporarily loaded into a volatile storage medium such as the RAM 316. Received communication signals and other data with information may also be stored in the RAM 316. Additionally, the storage component interface 322 receives the removable memory card 334, providing additional storage space for the smart card reader 110. In one embodiment, the memory card 334 may be a smart card similar to the smart cards known to those skilled in the art. The memory card 334 may include fingerprint authentication data, password or pin code related data, or other security related data. While operation of the smart card reader 110 is described using a smart card, it will be understood by those skilled in the art that the smart card reader 110 may be designed using any suitable form of removable media without departing from the intended scope of the smart card reader 110.

The stored program control (e.g. operating system 326, software applications 328) for the microprocessor 310 also includes a predetermined set of applications or code components or software modules that control basic device operations, for example, management and security related control of the data of the smart card reader 110 and may be installed on the smart card reader 110 as a component of the software applications 328 during the manufacturing process. Further applications may also be loaded (i.e., downloaded) onto the smart card reader 110 through the operation of the serial port 318, the short-range communications subsystem 320, or from the smart card 334. The downloaded code module or components are then installed by the user (or automatically) in the non-volatile program memory (e.g., the flash memory 314) or the RAM 316.

The serial port 318 comprises a USB type interface port for interfacing or synchronizing with another device, such as, the personal computer 100 (FIG. 2), or the mobile device 20 (FIG. 1). The serial port 318 is used to exchange data with a device such as the personal computer 100 to be stored on the smart card 334 that is plugged into the storage component interface 322 of the smart card reader 110. The serial port 318 is also used to extend the capabilities of the smart card reader 110 by providing for information or software downloads, including any user interface information, to the smart card reader 110.

In various example embodiments, the short-range communications subsystem 320 provides an interface for communication between the smart card reader 110 and the personal computer 100 or the mobile device 20. In one embodiment, the short-range communications subsystem 320 includes an infrared communication link or channel. In another embodiment, the subsystem 320 comprises a wireless RF bus protocol such as a Bluetooth™ communications subsystem. However, the short-range communications subsystem 320 may comprise any suitable local wireless means of communication, so long as the short range communications subsystem 232 of the personal computer 100 (FIG. 2) is chosen to operate using the same protocol, which may for example facilitate wireless communication between the personal computer 100 and the smart card reader 110. Any suitable communications mechanism and/or protocol may be implemented for the short range communications subsystems 320 and 232.

In order for the personal computer 100 to be able to properly communicate with the smart card reader 110, a suitable driver (hereinafter referred to as a smart card reader driver) can be loaded onto the personal computer 100 (e.g., as one of the drivers 244). For example, an operating system 236 such as Microsoft Windows may be applied to or loaded onto the personal computer 100 and may include its own system supplied smart card reader driver.

Figure 4:
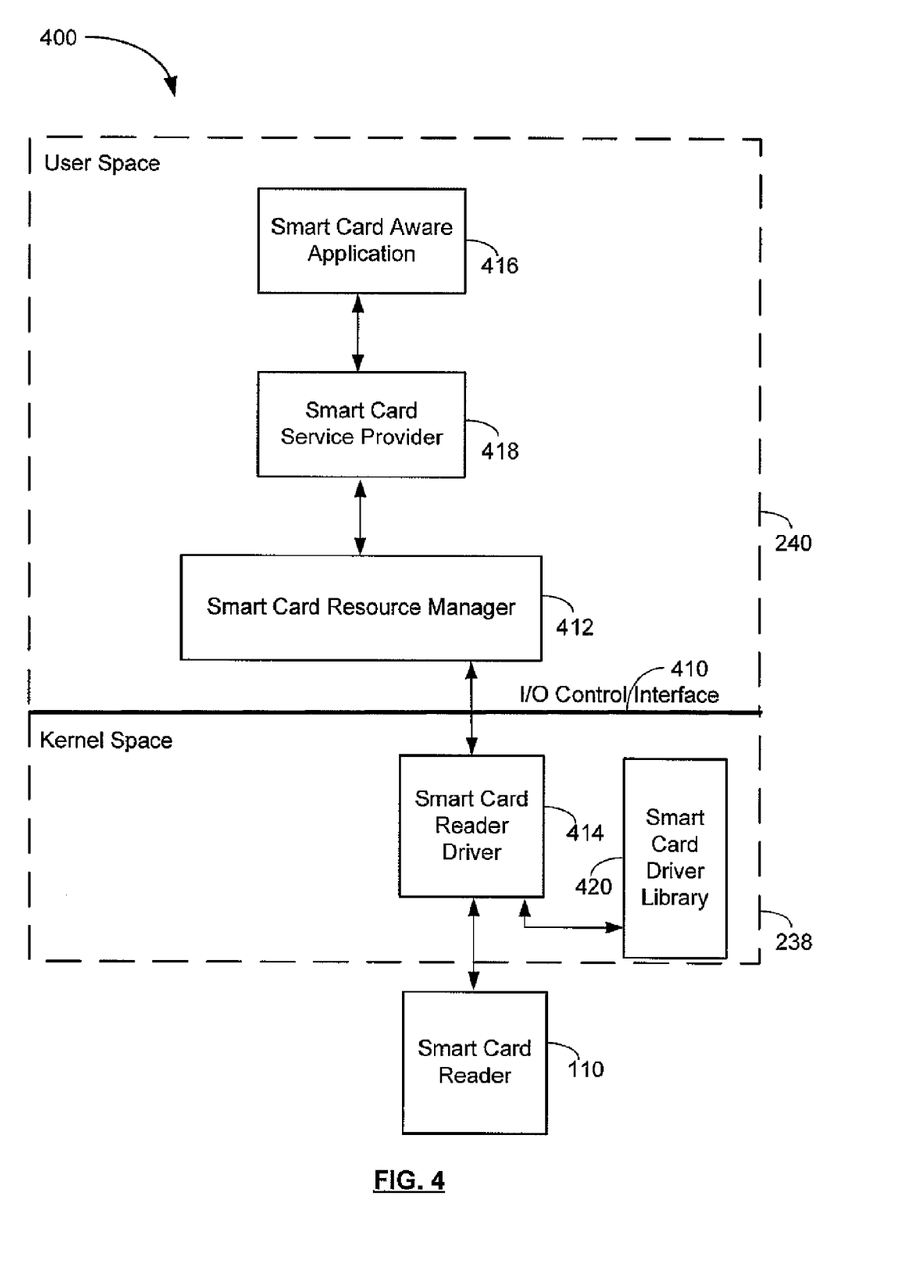
FIG. 4 shows in diagrammatic form a Microsoft Windows smart card environment.

Referring to FIG. 4, a diagram is shown illustrating a Microsoft Windows smart card environment 400, for example as described by the Windows Driver Development Kit (DDK). For purposes a facilitating an understanding of example embodiments of the invention that are described further below, a brief description will now be provided of the different components of the Microsoft Windows smart card environment 400, for communications with a smart card reader through a wired connection such as a Universal Serial Bus (USB) interface. The kernel space 238 and the user space 240 are indicated as shown in FIG. 4, with the interface between the kernel space 238 and the user space 240 referred to as an I/O control interface 410. Applications communicate with a smart card reader driver 414 by means of a smart card resource manager 412. In one example embodiment, the smart card reader driver 414 is a vendor supplied smart card reader driver supplied by the vendor of smart card reader 110 and resides in the kernel space 238. In some embodiments, the smart card reader driver 414 may be provided by the source of the operating system 236 (e.g. Microsoft™), rather than the vendor of the smart card reader 110. The smart card resource manager 412 resides in the user space 240. As shown, the smart card reader driver 414 communicates with the smart card reader 110. The resource manager 412 communicates with the smart card reader driver 414 by means of an I/O control function (i.e., the IOCTL( )) function) across the I/O control interface 410. The I/O control functions are dispatched using a DeviceIoControl system call. A smart card aware application 416 may send instructions to the smart card reader driver 414 by means of the system call DeviceIoControl, and the operating system forwards the indicated I/O control function to the smart card reader driver 414. I/O control functions initiated by the smart card aware applications 416 are passed to a smart card service provider 418, which passes the function to the smart card resource manager 412, which manages the resources related to the smart card reader 110 and may communicate with the smart card reader driver 414.fhe operating system forwards the request by means of an I/O request packet (IRP).

In some example embodiments, the smart card reader driver 414 is designed to work with the resource manager 412 and a smart card driver library 420 supplied with operating system 236. Thus, the smart card reader driver 414 may use the smart card driver library 420 to perform many of its key operations.

Figure 5:
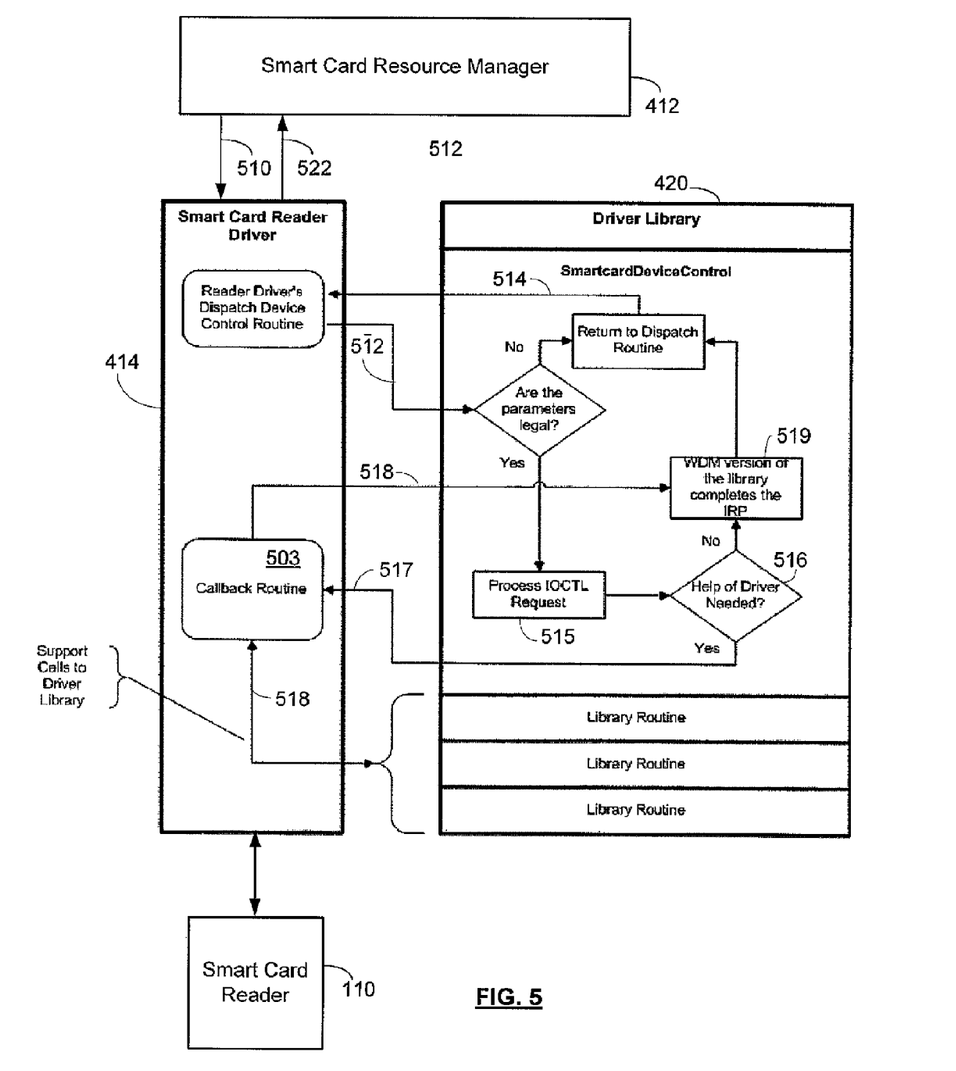
FIG. 5 shows in diagrammatic form the interaction between the smart card reader driver and the windows smart card driver library in the smart card reader environment as shown in FIG. 4.

FIG. 5 illustrates generally an interaction between the smart card reader driver 414 and the windows smart card driver library 420, for example as described by the DDK. With reference to FIG. 5, the steps that the smart card reader driver 414 must take together with the supplied driver library 420 to process an I/O control request (IOCTL( ) are described. As indicated by reference 510, the smart card reader driver 414 receives an IOCTL( )) call from the smart card resource manager 412. The smart card reader driver 414 passes IOCTL control requests to a SmartcardDeviceControl driver library routine in the smart card driver library 420 (e.g., a Windows Driver Model (WDM) based driver), as indicated by reference 512. If the parameters that the smart card reader driver 414 passes to SmartcardDeviceControl are incorrect, SmartcardDeviceControl returns with an error message, as indicated by reference 514. In the WDM version of the driver library 420, SmartcardDeviceControl returns without completing the IRP if the parameters are incorrect. Typically, the parameters in the IRP are intended for a specific smart card action. The IRP is a structure for parameters associated with the specific action to be passed back and forth between the smart card resource manager 412, the smart card reader driver 414 and the smart card driver library 420. In the event that the parameters are incorrect, a status value inside the IRP indicates to the smart card resource manager 412 that the intended smart card action was not successfully completed.

If the parameters are correct, SmartcardDeviceControl processes the IOCTL request if it can (step 515). SmartcardDeviceControl then checks to see if the smart card reader driver 414 has a callback defined for the IOCTL( )) request that it is processing (step 516). If the callback exists, SmartcardDeviceControl calls the callback, as indicated by reference 517. The smart card reader driver 414 callback routine 503 then calls all the driver library routines that are required to complete the processing of the IOCTL, as indicated by reference 518. After processing the IOCTL( ) function, the callback routine returns to the SmartCardDeviceControl function, as indicated by reference 518. In the WDM version of the library, SmartcardDeviceControl completes the IRP that carried the IOCTL( ) as indicated by reference 519. SmartcardDeviceControl then returns control to the reader driver dispatch routine, as indicated by reference 514. The smart card reader driver 414 then returns the IOCTL( )) call to the smart card resource manager 412, as indicated by reference 522.

The smart card library driver 420 synchronizes access to the smart card reader driver 414 so that no two callback functions are called at the same time. However, card insertion and removal event handling (e.g., when the smart card reader 110 indicates that the smart card 334 is either inserted into or removed from the storage interface 322, shown in FIG. 3 may be processed asynchronously.

Figure 6:
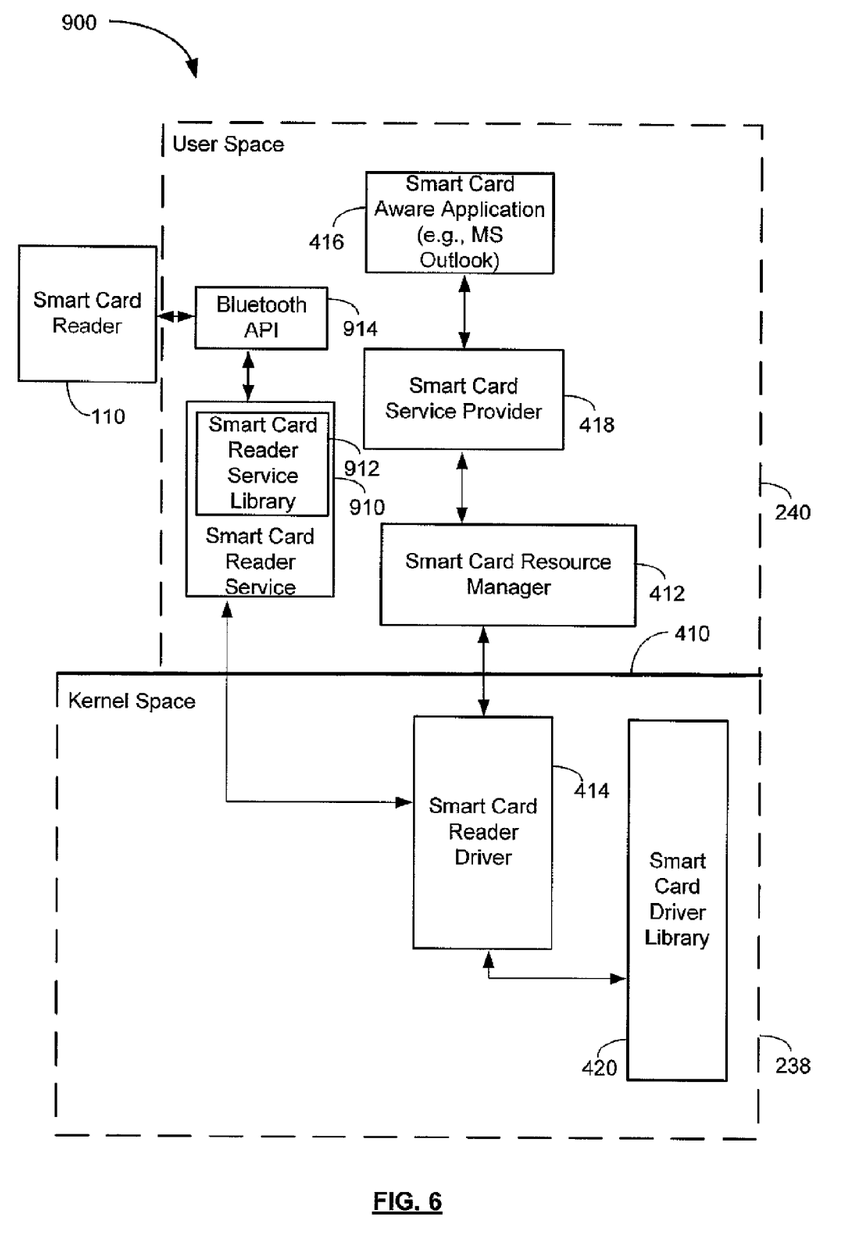
FIG. 6 shows in diagrammatic form a smart card reader environment.

Referring now to FIG. 6, another smart card environment 900 is illustrated in accordance with example embodiments of the invention. The smart card environment 900 is similar to the environment 400 of FIG. 4, described above, except that in environment 900 a wireless air interface exists between the smart card reader 110 and the personal computer 100, rather than a wired USB interface as shown in FIG. 4. As indicated above, user applications (e.g., such as Microsoft Outlook or Microsoft Word) typically reside in the user space 240, and drivers (including smart card reader driver 414) reside in the kernelspace 238. In at least some example embodiments, placing a driver such as the smart card reader driver 414 in the kernel space 238, as required by Microsoft Windows, can raise two possible issues: (a) the user interface components 248 cannot be directly accessed and/or displayed by code residing in the kernel space 238; and (b) the Bluetooth application programming interface (API), which is installed as one of the APIs 246 and is used to access the Bluetooth communications port (i.e., the short range communications subsystem 232), cannot be directly accessed from the kernel space 238. Since Bluetooth communications between the personal computer 100 and the smart card reader 110 would have to occur via the Bluetooth API, the Bluetooth API must be accessible to a smart card reader driver to be installed on the personal computer 100. The smart card reader driver to be used on the personal computer 100 also needs access to the UI components 248 so that a user of the personal computer 100 can input Bluetooth secure pairing keys using the UI components 248, as well as other information.

To address the above two issues, the example embodiment shown in environment 900 of FIG. 6 includes a user space 240 application, referred to as a smart card reader service (SCRS) 910. The SCRS 910 is placed in the user space 240 and therefore has access to the Bluetooth API 914, as the APIs 246 also reside in the user space 240. Therefore, using the Bluetooth API 914, the SCRS 910 is capable of opening a Bluetooth communication port. The SCRS 910 takes messages from the Smart Card Reader Driver 414 and sends the messages to the smart card reader 110 through the Bluetooth communication port (e.g., using the short range communications subsystems 232 and 320). Since the SCRS 910 resides in the user space 240, the SCRS can make display calls to the user interface at any time, using the user interface components 248.

Turning again to environment 400 of FIG. 4 in which a wired interface (e.g. a USB connection) exists between the personal computer 100 and the smart card reader 110, in such an environment messages or data destined for the smart card reader 110 are passed from the smart card reader driver 414 through the driver stack to the USB or serial driver, since all the drivers 244 are located in the kernel space 238. The USB or serial driver then sends these messages to the smart card reader 110 over the serial connection. Turning back again to environment 900 of FIG. 6, in such an environment communication between the personal computer 100 and the smart card reader 110 is achieved via an air interface (e.g. a Bluetooth connection between short range communications subsystems 234 and 320). As the smart card reader driver 414 is located in the kernel space 238 and does not have access to Bluetooth drivers, messages are passed back into the user space 240 to the smart card reader service 910 and the available Bluetooth API 914 is used. Communication between the smart card reader driver 414 and the smart card reader service 910 is facilitated by a smart card reader service library 912. The smart card reader service library 912 includes a set of function calls that the smart card reader service 910 uses to communicate with the smart card reader driver 414.

Environment 900 will now be further explained in the context of the following example. A user who is currently using the desktop computer 100 may wish to login to his smart card 334, which is inserted into the storage component interface 332 of the smart card reader 110, using the short range communications subsystems 232 (FIG. 2) and 320 (FIG. 3) as the means of connectivity between the personal computer 100 and the smart card reader 110. In one example, a request may come from Microsoft Outlook (i.e., one of the smart card aware applications 416) as a result of the user wishing to insert an encrypted digital signature that is stored on the smart card 334 into an email. In the current example, Microsoft Outlook first sends a message to the Windows smart card service provider 418 requesting the login to the specific smart card 334. For example, the smart card service provider 418 may create a command Application Protocol Data Unit (APDU) to be sent to the smart card 334. An APDU is a standardized data structure for smart card systems, for example as defined by ISO 7816. The smart card service provider 418 then passes the APDU to the Windows smart card resource manager 412, which passes the APDU across the I/O control interface 410 to the smart card reader driver 414. The smart card reader driver 414 then passes the APDU on to the smart card driver library 420. The smart card driver library 420 uses a callback function to pass the APDU back to the smart card reader driver 414. This callback function notifies the smart card reader driver that the smart card reader driver 414 is to send the APDU to the smart card reader 110 and wait for a response from the smart card reader 110. The smart card reader driver 414 then passes the APDU up to the smart card reader service 910 using commands and/or functions that are part of the smart card reader service library 912. The smart card reader service 910 sends the APDU over the Bluetooth connection (i.e., using the short range communications subsystem 232 and 320 shown in FIGS. 2 and 3) using the Bluetooth API 914 to the smart card reader 110. The smart card reader 110 then processes the APDU and returns the appropriate response. This response from the smart card reader 110 follows the same path, in reverse fashion, back to Microsoft Outlook (or the applicable smart card aware application 416).

As indicated above, the smart card reader service library 912 includes a set of function calls that the smart card reader service 910 uses to communicate with the smart card reader driver 414. The smart card reader service 910 also uses the smart card reader service library 912 to communicate with the smart card reader 110, in order to perform certain functions or routines provided in the smart card reader service library 912.

Figure 8:
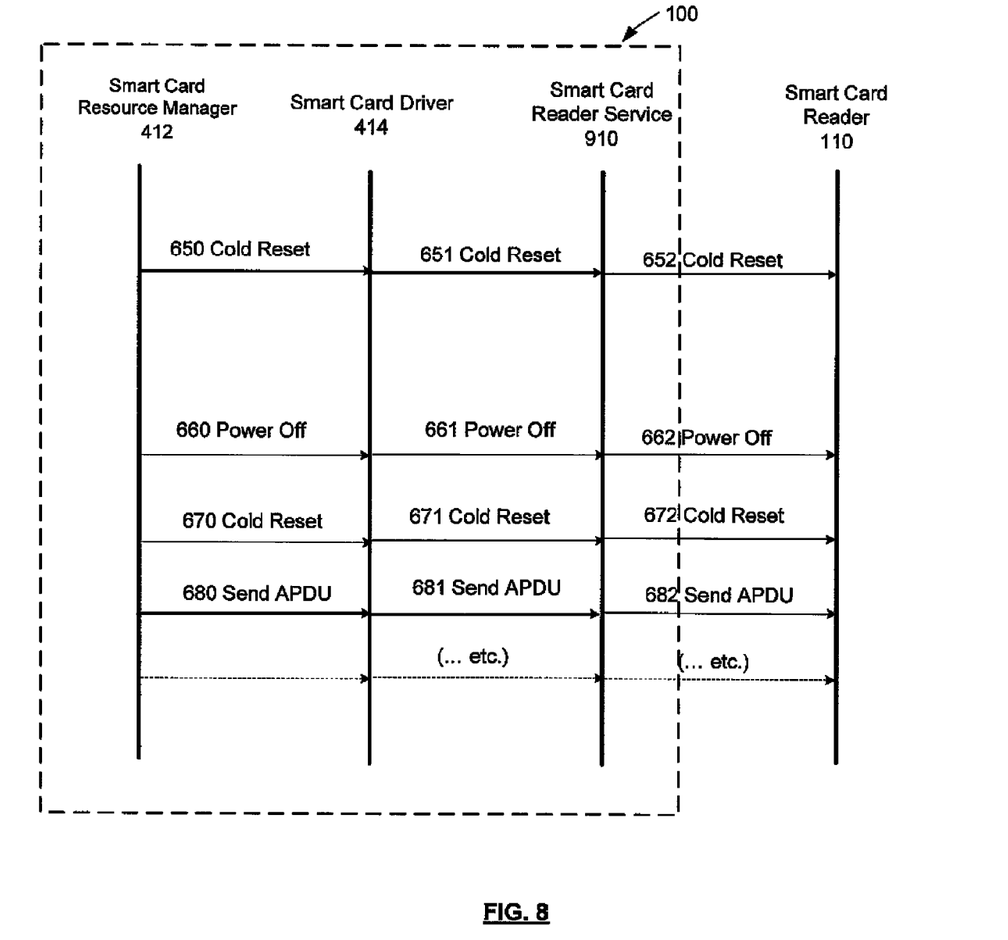
FIG. 8 shows an example conversation between a smart card resource manager, a vendor supplied smart card reader driver, the smart card reader service and a smart card reader, for carrying out the method of FIG. 7.

Referring briefly to FIG. 8, there are a number of commands that may be sent from a smart card aware application 416 to a smart card reader 110 (e.g., via the path as described above in the context of FIG. 6). A "cold reset" command may for example be used to reset the smart card 334. The "cold reset" command may also be used at any time the smart card aware application 416 is to start a new or clean session with the smart card 334. For example, the "cold reset" command may be used when the computer 100 receives a message from the smart card reader 110 that the smart card 334 has just been inserted into the smart card reader 110, such that the smart card 334 is in a known (reset) state. In at least some example embodiments, the smart card 334 (and its associated reader 110) is in a known state when the smart card reader 110 is known to have recently come out of reset and no Application Protocol Data Units (APDU) have been sent or received by the smart card reader 110 since it came out of reset. As indicated above, an APDU is a standardized data structure for smart card systems, for example as defined by ISO 7816. A send Application Protocol Data Unit ("Send APDU") command sends an APDU. A "power off" command disengages or turns off the smart card 334. In at least some example embodiments, the smart card reader 110 is used to provide user authentication information, digital certificate information and/or encryption key information to the personal computer 100.

Generally, example embodiments described herein are directed to reducing redundant or unnecessary commands being sent to the smart card reader 110. It is often the case where the manufacturer of a vendor supplied smart card reader driver is different than at least one of the other applications (such as the operating system 326 and/or smart card resource manager 412). Certain operational characteristics of a vendor supplied smart card reader driver and an associated smart card reader service are thus described herein to facilitate such example embodiments.

Figure 7:
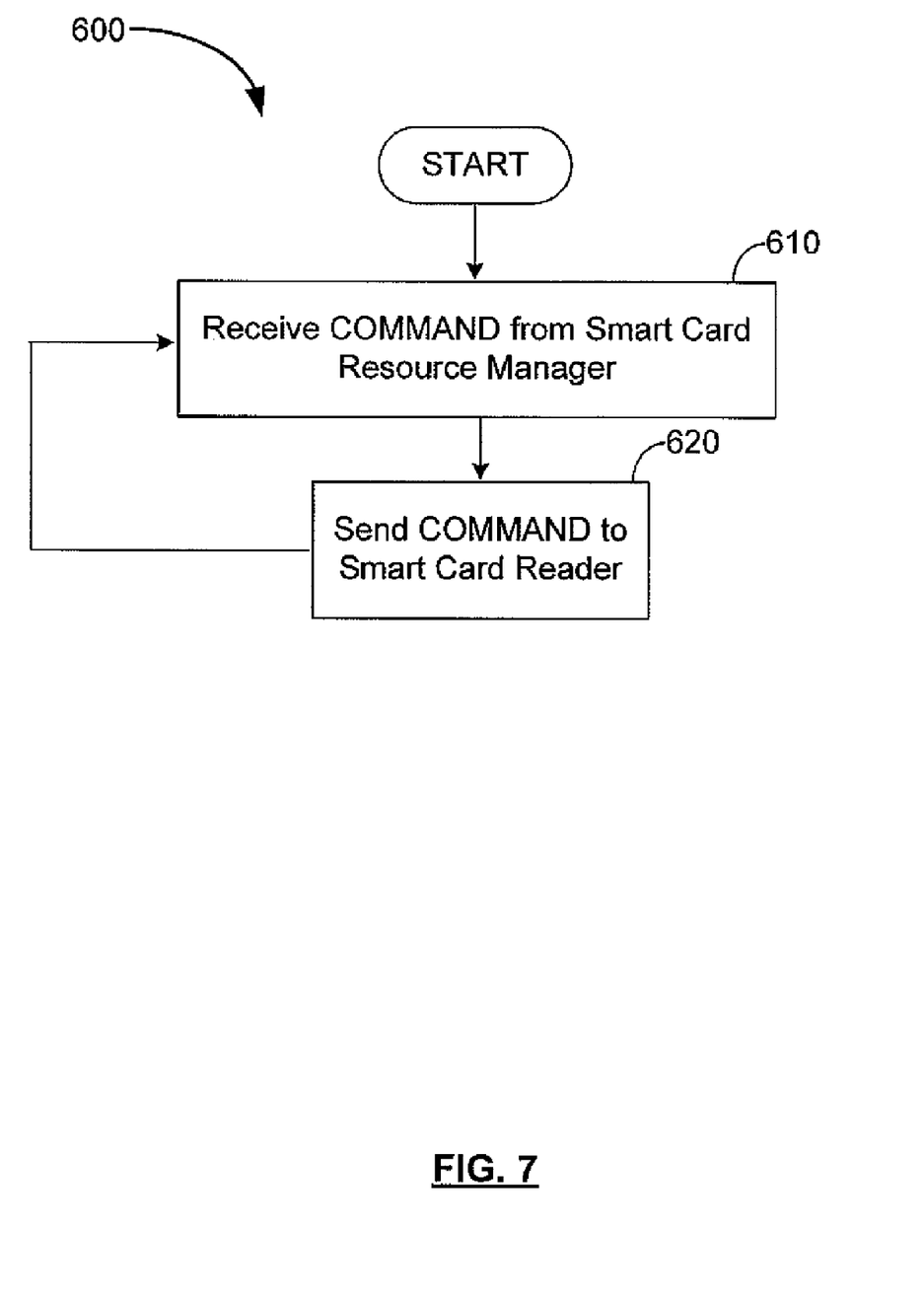
FIG. 7 shows a flow diagram of a conventional method carried out by a smart card reader service.

Reference is now made to FIGS. 7 and 8, which show examples of methods for sending commands to the smart card reader 110. FIG. 7 shows a method as carried out by the smart card reader service 910, while FIG. 8 illustrates an example conversation between the smart card resource manager 412, the vendor supplied smart card reader driver 414, the smart card reader service 910, and the smart card reader 110. Generally, in the examples of FIGS. 7 and 8, the smart card reader service 910 acts as a flow-through or relay for any instructions from the smart card resource manager 412. Thus, referring to FIG. 7, the smart card reader service 910 may perform the example algorithm 600, as shown. At a first step 610, the smart card reader service 910 receives, through the smart card reader driver 414, a command from the smart card resource manager 412. At step 620, in response, the smart card reader service 910 sends the command, through the Bluetooth API 914, in an appropriate command format that may be understood by the smart card reader 110, for processing by the smart card reader 110 (and subsequently the smart card 334).

Referring now to FIG. 8, an example of a message exchange between the smart card resource manager 412, the smart card reader driver 414, the smart card reader service 910, and the smart card reader 110 is illustrated. Passage of time is generally traversed from top to bottom of the conversation shown in FIG. 8. The illustrated conversation may for example start when the personal computer 100 receives a message from smart card reader 110 indicating that a smart card 334 has been inserted into the smart card reader 110. Note that the smart card reader 110 may be configured in some embodiments to send a smart card insertion notification message to the personal computer 100 even if the smart card 334 was not just inserted into the smart card reader 110. For example, in one embodiment, card insert/card removal messages are used not only in the conventional sense (i.e. when a smart card has been physically inserted into or removed from the smart card reader 110), but also to share access to the smart card reader 110. For example, in an embodiment where the smart card reader can pair with or communicate with two different applications or devices (for example a personal computer and a mobile communications device), the smart card reader 110 will send a card removal message to one application/device, which forces that application or device to stop sending messages to the smartcard reader 110. At the same time, the smart card reader 110 will send a card insert message to another application/device thereby allowing the other application device to send messages to the smart card reader 110.

When the personal computer 100 receives a smart card insertion notification message, the smart card resource manager 412 may send a number of commands intended to be processed by the smart card reader 110. As shown, the smart card resource manager 412 may send the commands of "cold reset" 650, "power off" 660, "cold reset" 670, "send APDU" 680, etc. In response, the smart card reader driver 414 will relay or send the command in the appropriate command format to the smart card reader service 910, as shown in corresponding commands of "cold reset" 651, "power off" 661, "cold reset" 671, "send APDU" 681, etc. The smart card reader service 910 will relay or send the command in the appropriate command format, through the Bluetooth API 914, to the smart card reader 110, as shown in corresponding commands of "cold reset" 652, "power off" 662, "cold reset"

672, "send APDU" 682, etc. Each step, notably the power off 660 and cold reset 670, takes time of up to at least a few seconds for the system to implement.

Inefficiencies may arise from the above method. For example, the first instance of cold reset 650 has caused the smart card 334 to be in a reset state. This reset state is known to the smart card resource manager 412. The subsequent steps of power off 660 and cold reset 670 may thus be redundant in view of the fact that the reset state is a known state, and as such may not be necessary to be sent to the smart card reader 110. It is also recognized herein that since no APDU is sent to the smart card reader 110 before the steps of power off 660 and cold reset 670, these steps are unnecessary as the smart card 334 would still be in the same known reset state.

Figure 9:
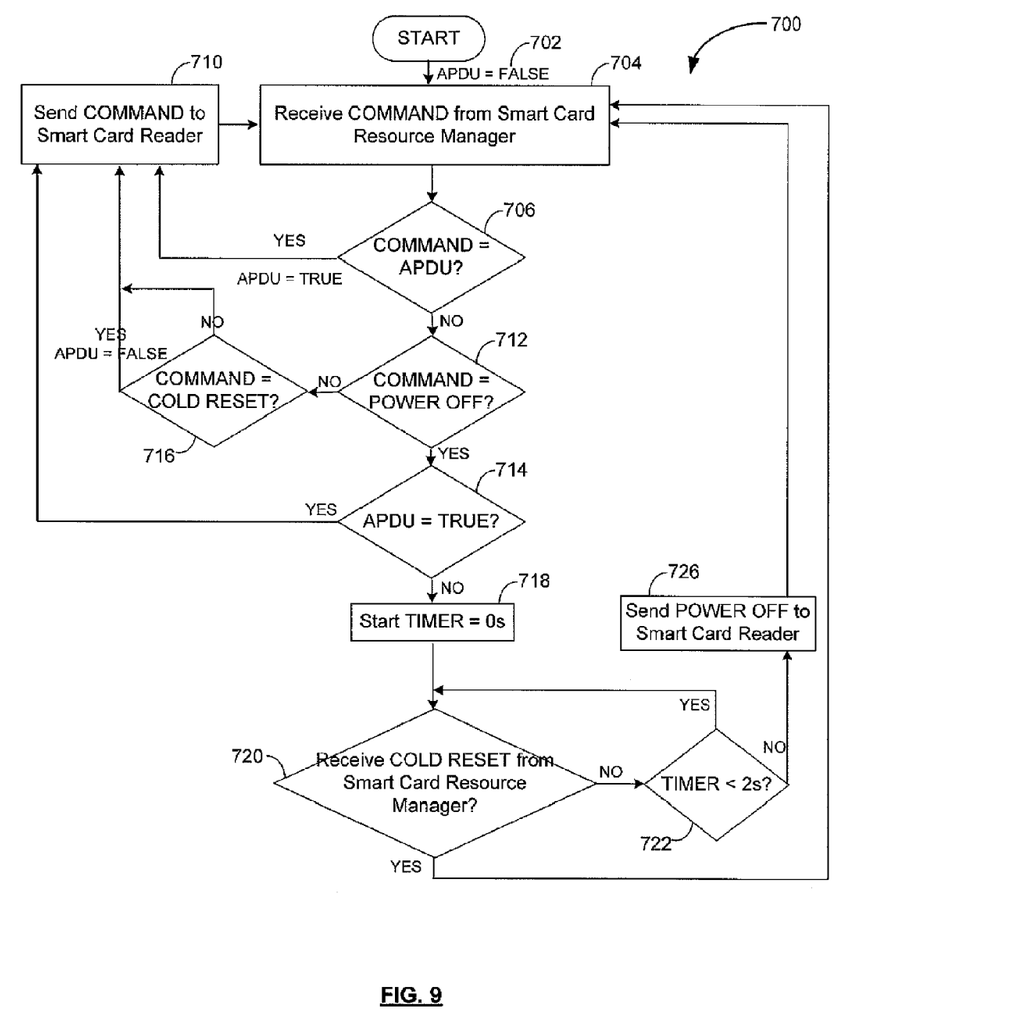
FIG. 9 shows a flow diagram of a method carried out by a smart card reader service in accordance with one embodiment.
Figure 10:
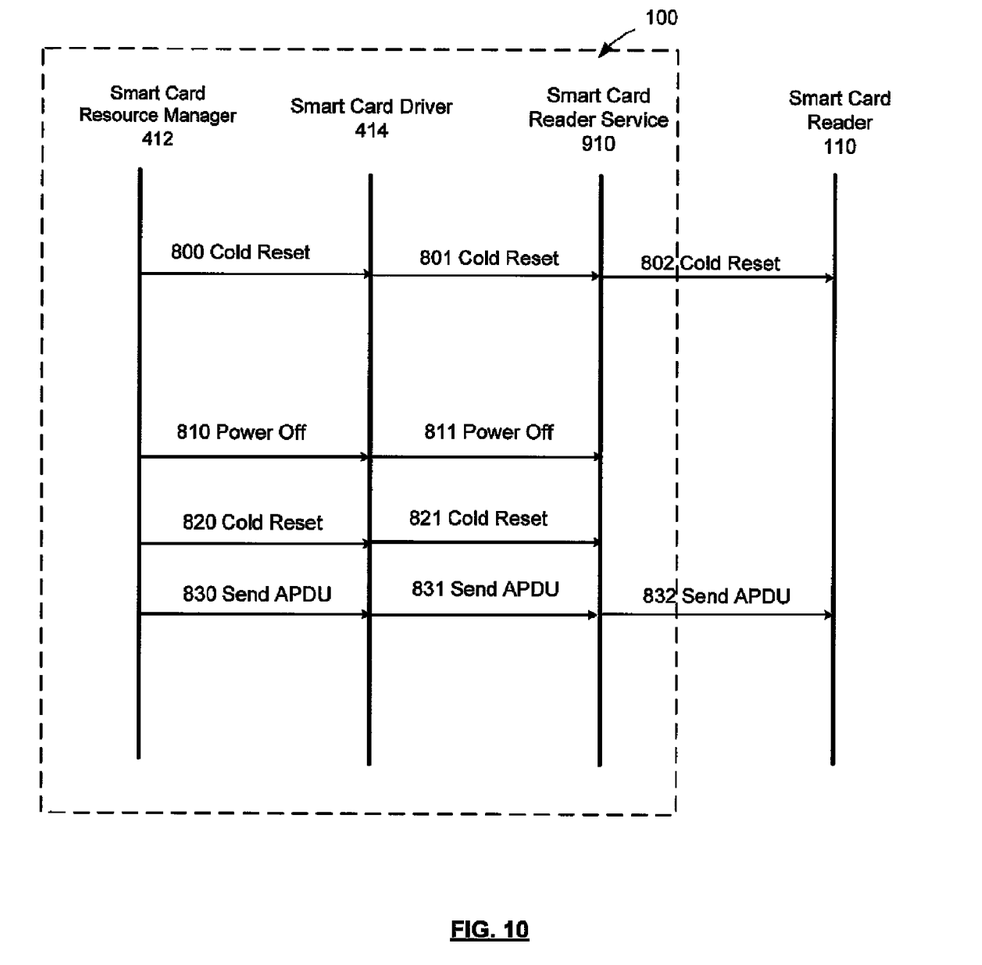
FIG. 10 shows an example conversation between a smart card resource manager, a vendor supplied smart card reader driver, the smart card reader service and a smart card reader, for carrying out the method of FIG. 9 in accordance with one embodiment.

Accordingly, an example embodiment of an alternative method performed by a smart card reader service 910 will now be explained, with reference to FIGS. 9 and 10. The method shown in FIGS. 9 and 10 is similar to the method shown in FIGS. 6 and 7 subject to differences that will be apparent from the Figures and the present description. FIG. 1 shows a flow diagram of the alternative method carried out by the smart card reader service 910, while FIG. 10 shows an example conversation using such alternative method as between the smart card resource manager 412, the smart card reader driver 414, the smart card reader service 910, and the smart card reader 110. Referring now to FIG. 9, the smart card reader service 910 processes received commands (from the smart card reader driver 414) and determines whether certain commands should be sent to the smart card reader 110 and which commands should not be sent. Prior to the start of the algorithm 700, it is assumed that the system is in a known state, for example a reset state where no command APDUs have been received. Thus, initially, at step 702, a data indicator APDU may be set to FALSE. The data indicator APDU will be explained in further detail below. At step 704, the algorithm 700 receives a command (i.e., COMMAND) from the smart card resource manager 412. Note that although the present method re-uses COMMAND as a single variable throughout the algorithm 700, it can be appreciated that any number of commands may be stored, queued, and/or processed as appropriate. At step 706, the algorithm 700 determines whether COMMAND is an APDU. If so, the data indicator APDU is set to TRUE and the COMMAND is sent to the smart card reader 110 (i.e., step 710). If in step 706 a determination is made that COMMAND is not an APDU, the algorithm 700 then determines whether COMMAND is power off, as indicated at step 712. If not, then as indicated at step 716, a determination is then made if COMMAND is a cold reset. If the COMMAND is a cold reset, then data indicator APDU is set to FALSE. The COMMAND is then sent to the smart card reader 110 (i.e., step 710). Considering again step 712, if a determination was made at step 712 that the COMMAND is power off, and then at step 714, the algorithm 700 determines whether the data indicator APDU is TRUE. If so, COMMAND is sent through the Bluetooth API 914 to the smart card reader 110 (i.e., step 710). If at determination step 714 the data indicator APDU is FALSE, the algorithm 700 proceeds to step 718.

At step 718, a TIMER is initially set at zero seconds. Generally, the TIMER may be used to determine whether a predetermined time has elapsed between a power off and a cold reset. In the example shown, the predetermined time is 2 seconds. The determination or selection of the predetermined time may for example be slightly greater than the time that it would normally take for the service to receive a cold reset command immediately after receiving a power off command. This would facilitate the situations where these two commands arrive sequentially in relatively quick succession, so that the algorithm 700 may optimize the discarding of both commands. Note that there is no strict upper bound on what is selected as the predetermined time. However, in the case where the smart card resource manager 412 is only sending a power off and has no intention of sending a cold reset, and if the predetermined time is too high, the smart card resource manager 412 will be unnecessarily preventing other devices from accessing the smart card. If an excessive time or greater than the predetermined time has elapsed, then the power off command is sent to the smart card reader 110 and the method proceeds at the initial step 704. A reason for this is that after the predetermined time has elapsed, it is unlikely that the smart card reader service 910 will receive a "Cold Reset" command from the smart card resource manager 412. In this case the smart card 334 should be powered down by way of the power off command. At step 720, the algorithm 700 is constantly polling within the predetermined time to determine whether the cold reset command is received by the smart card reader service 910. Thus, at step 722, the algorithm 700 determines whether 2 seconds has elapsed. If so, then the smart card reader driver 414 sends the power off command to the smart card reader 110 and the method proceeds at the initial step 704. If the cold reset is sent to the smart card reader 110 within 2 seconds, the algorithm 700 returns to the initial step 704, i.e., the power off command and cold reset command are not sent to the smart card reader 110.

Referring now to FIG. 10, an example conversation using the above described method may take place between the smart card resource manager 412, the smart card reader driver 414, smart card reader service 910, and the smart card reader 110. Passage of time is generally traversed from top to bottom of the conversation shown in FIG. 10. Communications between the smart card resource manager 412, the vendor supplied smart card driver 414, and the smart card reader service 910 occur within the personal computer 100, and communications between the smart card reader service 910 and the smart card reader 110 occur in at least some example embodiments over a wireless link such as a Bluetooth™ connection. Generally, the smart card resource manager 412 and the smart card reader driver 414 are sending the same commands to the smart card reader service 910 as in the example conversation of FIG. 8. The illustrated conversation may for example start when the personal computer 100 receives a smart card insertion notification message from smart card reader 110 indicating that a smart card 334 has been inserted into the smart card reader 110. In an embodiment, the smart card reader 110 would be unaware of which commands the smart card resource manager 412 is sending and which are being filtered by the smart card reader service 910. As illustrated, the commands being sent are cold reset 800, power off 810, cold reset 820, and send APDU 830, etc. As shown, the commands that are sent from the smart card driver 414 to the smart card reader service 910 are cold reset 801, power off 811, cold reset 821, and send APDU 831. Also shown are the commands that are sent from the smart card reader service 910 to the smart card reader 110, which are cold reset 802 and send APDU 832. The handling of each command by the smart card reader service 910 will now be explained with reference to the algorithm 700 (FIG. 9).

Using the algorithm 700 shown in FIG. 9, the cold reset 801 command would be received as COMMAND at step 704. At step 706, at the decision of whether COMMAND=APDU?, the answer would be NO, since cold reset is not an APDU, and thus the algorithm 700 proceeds to step 712. Similarly, at step 712, at the decision of whether COMMAND=power off, the answer would be NO, and thus the algorithm 700 proceeds to step 716. At step 716, at the decision of whether COMMAND=cold reset, the answer would be YES, and the data indicator APDU is set to FALSE. At step 710, the cold reset command is then sent to the smart card reader 110, i.e., by sending cold reset 802 (FIG. 10).

The power off 811 command and cold reset 821 command will now be explained with reference to FIG. 9. Using the algorithm 700 shown in FIG. 9, the power off 811 command would be received as COMMAND at step 704. At step 706, at the decision of whether COMMAND=APDU?, the answer would be NO, since power off is not an APDU, and thus the algorithm 700 proceeds to step 712. Similarly, at step 712, at the decision of whether COMMAND=power off, the answer would be YES, and thus the algorithm 700 proceeds to step 714. At step 714, at the decision of whether APDU=TRUE, the answer would be NO (i.e., since no APDUs have been sent), and the algorithm proceeds to step 718, At step 718, a timer is reset to TIME=0 s. At step 720 and 722, the algorithm 700 continually waits for the predetermined time (e.g. 2 seconds) until a cold reset command is received. In the example conversation of FIG. 10, a cold reset 821 has been received within the 2 seconds, and as such the algorithm 700 proceeds to the initial step 704, i.e., neither the power off command nor the cold reset command are sent to the smart card reader 110 (as shown in the gap in the conversation in FIG. 10). By filtering out the power off command 811 and the cold reset command 821, a time savings can be achieved in some configurations for the method of FIG. 10 relative to the method of FIG. 8.

Referring again to step 722 of FIG. 9, if no command is received within 2 seconds, then, referring to step 726, a power off command would be sent to the smart card reader 110. In other words, it is as if the power off command was merely relayed through to the smart card reader 110 as in the typical or conventional case.

Continuing with the example, at step 704, a send APDU 831 command may be received by the smart card reader service 910. At step 706, at the decision of whether COMMAND=APDU?, the answer would be YES, and the data indicator APDU is set to TRUE. The algorithm 700 then proceeds to step 710. At step 710, the APDU command is then sent to the smart card reader 110, i.e., by send APDU 832 (FIG. 10).

Accordingly, in some example embodiments, referring again to FIG. 9, in the described algorithm 700 if an APDU command was sent by the smart card resource manager 412 before the power off command, then data indicator APDU would be set to TRUE. In consequence, subsequent commands would be merely relayed through to the smart card reader 110. A reason for this feature is that most smart card resource managers 412 assume that after a cold reset, the smart card 334 will be in a fresh session state in which no APDUs have been received. The described algorithm 700 assists in maintaining this assumption by permitting the power off and cold reset commands to go to the smart card reader 110 when an APDU has been previously sent.

It is understood that there may be additional steps in the above described conversation shown in FIG. 10. For example, there are certain responses that are made by the smart card reader 110 back to the smart card reader service 910 and to the smart card resource manager 412, for example an answer to reset (ATR), which are not illustrated in order to simplify the workings of embodiments of the system.

In the example embodiment described above in respect of FIGS. 9 and 10, the power off command is sent to the smart card reader 110 if any APDU is sent to the smart card reader 110 after the cold reset, and no distinction is made between APDUs that change the state of the of smart card and APDUs that do not change the state of the smart card. Thus, in the embodiments of FIGS. 9 and 10, an assumption is made that all ADPUs are potentially state altering, even though this may not reflect reality. One reason for making such an assumption is that some APDUs may be card dependent proprietary APDUs such that the smart card reader service 910 is unable to differentiate between state altering and non-state altering APDUs. In an alternative embodiment of the method shown in FIGS. 9 and 10, the response of the smart card reader service 910 can vary depending on the type of APDU command sent. For example, if APDU commands are received that would not alter the state of the smart card 334 from a known state (such as the reset state), then the smart card reader service 910 would refrain from sending the power off and reset commands to the smart card reader 110. In such an alternative embodiment, decision block 706 is modified to set APDU=TRUE only when (i) the received command is known to be a state altering command (other than power off or cold rest); or (ii) the smart card reader service 910 does not know if the received command is a state altering command or not. Information about the state altering nature of various smartcard commands can be stored, for example, in a look up table on personal computer 100. Accordingly, in some example embodiments, the smart card is in a known state when, subsequent to a reset command being sent to the smart card reader, no state changing APDUs have been sent or received by the smart card.

The above-described embodiments of the present application are intended to be examples only. Alterations, modifications and variations may be effected to the particular embodiments by those skilled in the art without departing from the scope of the application.

What is claimed is:

1. A method of facilitating communication with a smart card via a smart card reader, said method comprising:
   receiving a first command destined for said smart card;
   determining that said first command has a first type;
   sending said first command to said smart card reader;
   subsequently to receiving said first command destined for said smart card, receiving a second command destined for said smart card;
   determining that said second command has a second type that differs from said first type;
   subsequently to receiving said second command destined for said smart card, receiving a third command destined for said smart card;
   determining that said third command has said first type;
   subsequently to receiving said third command destined for said smart card, receiving a fourth command destined for said smart card;
   determining that said fourth command has a third type that differs from said first type and from said second type;
   discarding said second command and said third command; and
   sending said fourth command to said smart card reader.

2. The method of claim 1 wherein said first type comprises cold reset.

3. The method of claim 1 wherein said second type comprises power off.

4. The method of claim 1 wherein said third type comprises send application protocol data unit.

5. The method of claim 1 further comprising, responsive to said determining that said second command has said second type, operating a timer.

6. The method of claim 1 further comprising:
responsive to said determining that said third command has said first type, determining, from a timer, an elapsed time between said receiving said second command and said receiving said third command; and
determining that a predetermined time exceeds said elapsed time.

7. The method of claim 1 further comprising employing a wireless communication protocol for said sending said first command to said smart card reader.

8. The method of claim 7 wherein said wireless communication protocol is a wireless personal area network protocol.

9. A computer device comprising:
a processor configured to:
receive a first command destined for a smart card;
determine that said first command has a first type;
send said first command to a smart card reader;
subsequently to receiving said first command destined for said smart card, receive a second command destined for said smart card;
determine that said second command has a second type that differs from said first type;
subsequently to receiving said second command destined for said smart card, receive a third command destined for said smart card;
determine that said third command has said first type;
subsequently to receiving said third command destined for said smart card, receive a fourth command destined for said smart card;
determine that said fourth command has a third type that differs from said first type and from said second type;
discard said second command and said third command; and
send said fourth command to said smart card reader.

10. The computer device of claim 9 wherein said first type comprises cold reset.

11. The computer device of claim 9 wherein said second type comprises power off.

12. The computer device of claim 9 wherein said third type comprises send application protocol data unit.

13. The computer device of claim 9 wherein said processor is further configured to, responsive to said determining that said second command has said second type, operate a timer.

14. The computer device of claim 13 wherein said processor is further configured to:
responsive to said determining that said third command has said first type, determine, from said timer, an elapsed time between said receiving said second command and said receiving said third command; and
determine that a predetermined time exceeds said elapsed time.

15. A computer readable storage medium containing computer-executable instructions that, when performed by a microprocessor, cause said microprocessor to:
receive a first command destined for said smart card;
determine that said first command has a first type;
send said first command to a smart card reader;
subsequently to receiving said first command destined for said smart card, receive a second command destined for said smart card;
determine that said second command has a second type that differs from said first type;
subsequently to receiving said second command destined for said smart card, receive a third command destined for said smart card;
determine that said third command has said first type;
subsequently to receiving said third command destined for said smart card, receive a fourth command destined for said smart card;
determine that said fourth command has a third type that differs from said first type and from said second type;
discard said second command and said third command; and
send said fourth command to said smart card reader.

16. The computer readable storage medium of claim 15 wherein said first type comprises cold reset.

17. The computer readable storage medium of claim 15 wherein said second type comprises power off.

18. The computer readable storage medium of claim 15 wherein said third type comprises send application protocol data unit.

19. The computer readable storage medium of claim 15 wherein said instructions further cause said microprocessor to, responsive to said determining that said second command has said second type, operate a timer.

20. The computer readable storage medium of claim 19 wherein said instructions further cause said microprocessor to:
responsive to said determining that said third command has said first type, determine, from said timer, an elapsed time between said receiving said second command and said receiving said third command; and
determine that a predetermined time exceeds said elapsed time.

* * * * *